(12) United States Patent
Nelson et al.

(10) Patent No.: US 12,017,876 B2
(45) Date of Patent: Jun. 25, 2024

(54) PACKAGING MATERIAL HOLDER

(71) Applicant: Encore Packaging LLC, Vernon Hills, IL (US)

(72) Inventors: Timothy H. Nelson, Winnetka, IL (US); Stephenson Nelson, Gurnee, IL (US)

(73) Assignee: ENCORE PACKAGING LLC, Lake Villa, IL (US)

( * ) Notice: Subject to any disclaimer, the term of this patent is extended or adjusted under 35 U.S.C. 154(b) by 71 days.

(21) Appl. No.: 17/838,537

(22) Filed: Jun. 13, 2022

(65) Prior Publication Data
US 2022/0315367 A1    Oct. 6, 2022

Related U.S. Application Data (63) Continuation-in-part of application No. 29/716,132, filed on Dec. 6, 2019, now Pat. No. Des. 954,544.

(51) Int. Cl.
*B65H 16/04* (2006.01)
*F16B 1/00* (2006.01)

(52) U.S. Cl.
CPC ............. *B65H 16/04* (2013.01); *F16B 1/00* (2013.01); *F16B 2200/83* (2023.08)

(58) Field of Classification Search
CPC ............. B65H 16/04; B65H 16/005; B65H 2301/3251; B65H 2402/43; B65H 2402/51; F16B 2200/83; F16B 45/00; B65B 67/085; A47K 10/3836; A47K 10/12; A47K 10/405; A47K 10/3687; A47K 10/22; A47K 2010/324
See application file for complete search history.

(56) References Cited

U.S. PATENT DOCUMENTS

| | | | |
|---|---|---|---|
| 1,119,396 A | 12/1914 | Bray | |
| 1,337,588 A | 4/1920 | Chapman | |
| D155,897 S * | 11/1949 | Huntington | 248/309.2 |
| 4,487,376 A | 12/1984 | Compton | |
| D308,781 S * | 6/1990 | Mintz | D6/523 |
| D448,592 S | 10/2001 | McBride | |
| D654,157 S * | 2/2012 | Gilbert | D23/304 |
| 9,725,028 B1 * | 8/2017 | Etzkorn | B60P 7/06 |
| D811,116 S | 2/2018 | Goodman | |
| D822,403 S | 7/2018 | Goodman | |

(Continued)

OTHER PUBLICATIONS

The Raymond Corporation; "Raymond Magnetic Stretch Wrap Holder"; 2014; Raymond Parts, 6650 Kirkville Road, East Syracuse, NY 13057; www.raymondparts.com; 1 page.

(Continued)

*Primary Examiner* — Ko H Chan
(74) *Attorney, Agent, or Firm* — Fitch, Even, Tabin & Flannery LLP (57) ABSTRACT

A packaging material holder comprising a bent shaft including a first arm, a base portion, and a second arm, and a plurality of magnets attached to the second arm is provided. The first arm includes an end which permits a roll of packaging material having an opening larger than a diameter of the end of the first arm to be placed over the end of the first arm and contact the base portion. The plurality of magnets magnetically couple to a magnetic surface and support a mass of the packaging material holder and a mass of the roll of packaging material.

13 Claims, 11 Drawing Sheets

(56) References Cited

U.S. PATENT DOCUMENTS

| | | | |
|---|---|---|---|
| D859,029 S | 9/2019 | Mariano | |
| 10,993,589 B2 * | 5/2021 | Haralovich | A47K 10/22 |
| D982,345 S * | 4/2023 | Sun | D6/523 |
| 2008/0011782 A1 | 1/2008 | Sidman | |
| 2009/0123233 A1 * | 5/2009 | Herzogenrath | B63B 35/32 |
| | | | 405/60 |
| 2010/0163696 A1 * | 7/2010 | Briggs | A47G 25/0607 |
| | | | 29/458 |
| 2018/0228322 A1 | 8/2018 | Goodman | |
| 2019/0069702 A1 * | 3/2019 | Laslo | A47K 10/12 |

OTHER PUBLICATIONS

Amazon.com: Jorestech Portable Manual Two-Handed Pallet Wrap Stretch Film Dispenser. (Mar. 1, 2018). Amazon. Retrieved Oct. 15, 2021, URL:<https://www.amazon.com/dp/B079F2TVD4/ref=cm_sw_em_r_mt_dp_WN56AA2JC1 R1VTP700XH? encoding=UTF8 &psc=1 > (Year: 2018).

Fastpack Packaging Inc. (Feb. 22, 2019). Magnetic Stretch Film Holder for the Warehouse [Video]. YouTube. Retrieved Oct. 20, 2021 URL:<https://www.youtube.com/watch?v=33C1Xzl1uvM> (Year: 2019) Fastpack.

Fastpack Packaging Inc. (Aug. 28, 2020). Accessed: Oct. 15, 2021. Magnetic Stretch Film Holder & Lite Weight Stretch Wrap Film Dispenser w/Magnet for Pre-Stretch [Video]. YouTube. U RL:<https://www.youtube.com/watch?v=DrUk_dGoqVU&t=52s> (Year: 2020).

\* cited by examiner

PACKAGING MATERIAL HOLDER

CROSS-REFERENCE TO RELATED APPLICATION

This application is a continuation-in-part of and claims the benefit of U.S. Design patent application Ser. No. 29/716,132, filed Dec. 6, 2019, which is incorporated by reference herein in its entirety.

TECHNICAL FIELD

This disclosure relates generally to packaging material holders, and more specifically, to packaging material holders utilizing a plurality of magnets.

BACKGROUND

Packaging material holders aid in storing packaging materials, such as rolls of stretch film, for ease of access and increased organization.

BRIEF DESCRIPTION OF THE DRAWINGS

Disclosed herein are embodiments of apparatuses pertaining to packaging material holders including and/or utilizing a plurality of magnets. This description includes drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments. Also, common but well-understood elements that are useful or necessary in a commercially feasible embodiment are often not depicted to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Described herein are apparatuses that are useful for holding and/or storing packaging material. Such apparatuses also may assist with organization of packaging materials, including, such as, rolls of packaging materials.

Whereas storing packaging materials in one location, such as a designated room, building, and/or warehouse, may cause delays in packing and/or packaging items, products, boxes, and the like, in instances where the items are stored in a different area than the packaging materials, these teachings may help avoid those delays. This may provide a local location for the storage of the packaging material. Further, the type of packaging material may change based on the specific location around the room or the warehouse. By providing a packaging material holder that can be placed in and around specific areas to allow for an ease of access of the packaging material, these delays may be shortened if not avoided altogether.

Generally speaking, pursuant to these various embodiments described herein, a packaging material holder includes a plurality of magnets to hold and support the packaging material holder and a roll of packaging material to a magnetic surface. In one illustrative approach, the packaging material holder includes a base portion, a first arm, and a second arm. The first arm includes an end configured to permit a roll of packaging material having an opening larger than a diameter of the end of the first arm to be placed over the end of the first arm and contact the base portion. So configured, the first arm provides a location to support a roll of packaging material. The packaging material holder also includes a plurality of magnets configured to magnetically couple to a magnetic surface and support a mass of the packaging material holder and a mass of the roll of packaging material supported by the first arm. The plurality of magnets may be attached to and disposed along the second arm and magnetically couple and/or attach the packaging material holder to a surface for holding and the storage of packaging material, such as a roll of stretch film or paper. The surface could be any surface capable of magnetically coupling to the magnets, such as a metal door frame, a shelving unit, and the like.

In some configurations, the packaging material holder includes stopper(s), member(s), and/or cover(s) having a coefficient of friction higher than a surface of the plurality of magnets that might engage a mounting surface. The stopper(s), member(s), and/or cover(s) could be made any suitable material such as rubber or plastic and attach to and/or are disposed along a length of the second arm to increase a friction force between the packaging material holder and the surface to which the packaging material holder is magnetically coupled.

In some embodiments, the packaging material holder includes the plurality of magnets in configurations such as a wing-structure, such as a configuration having at least one magnet on a first side of the second arm and at least one magnet on a second side of the second arm. The wing-structure may be used to provide support for the mass of the packaging material holder and the mass of the roll of packaging material.

The packaging material holder may include an associated mass and/or weight. Similarly, the roll of packaging material may include an associated mass and/or weight. The magnets, as well as any additional structures, such as the stoppers, members, and covers described herein, or any configurations of the magnets and/or the stoppers, members, and covers, such as the wing-structure, spacing, or placement of the elements discussed herein, provide sufficient magnetic and friction forces to overcome the mass and/or weight of the packaging material holder and, if placed on the packaging material holder, the mass and/or weight of the roll of packaging material for common use. The elements, configurations, structures, spacings, and placements may be selected or chosen to support this mass and/or weight to hold the packaging material holder to the mounting surface without slipping and/or sliding down the mounting surface, for example, during removal of packaging material from the roll.

Figure 1:
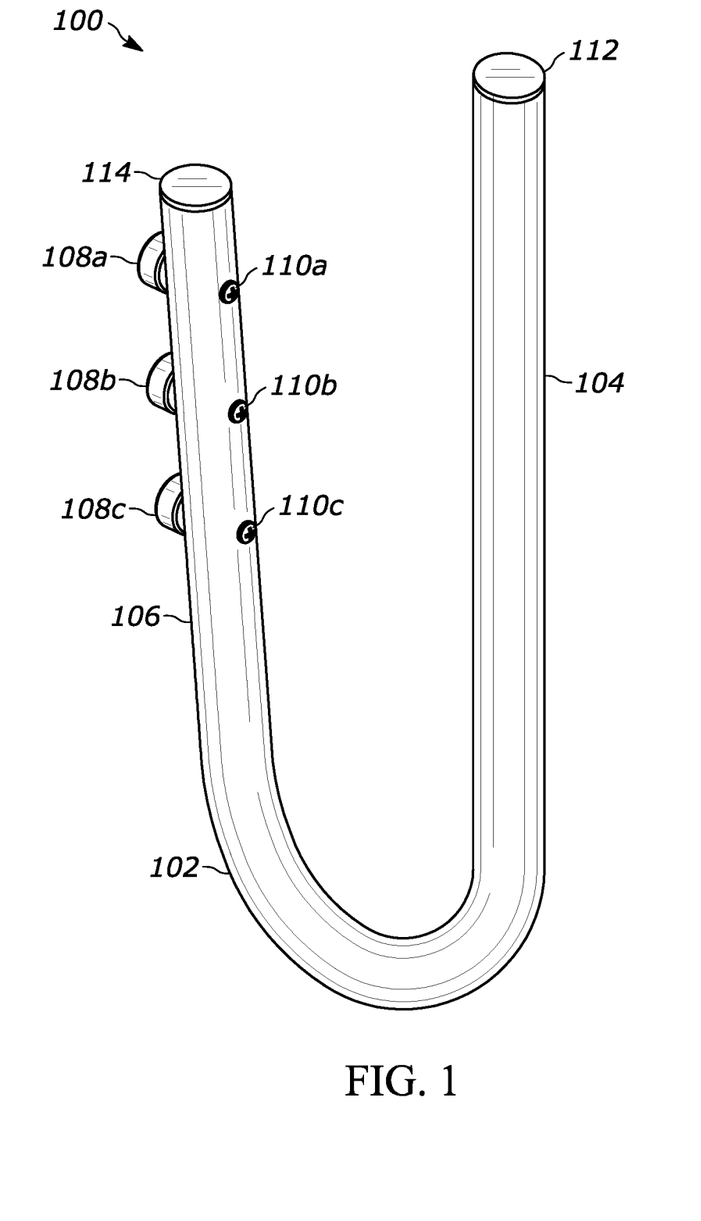
FIG. 1 is a perspective view of a packaging material holder in accordance with various embodiments.
Figure 2:
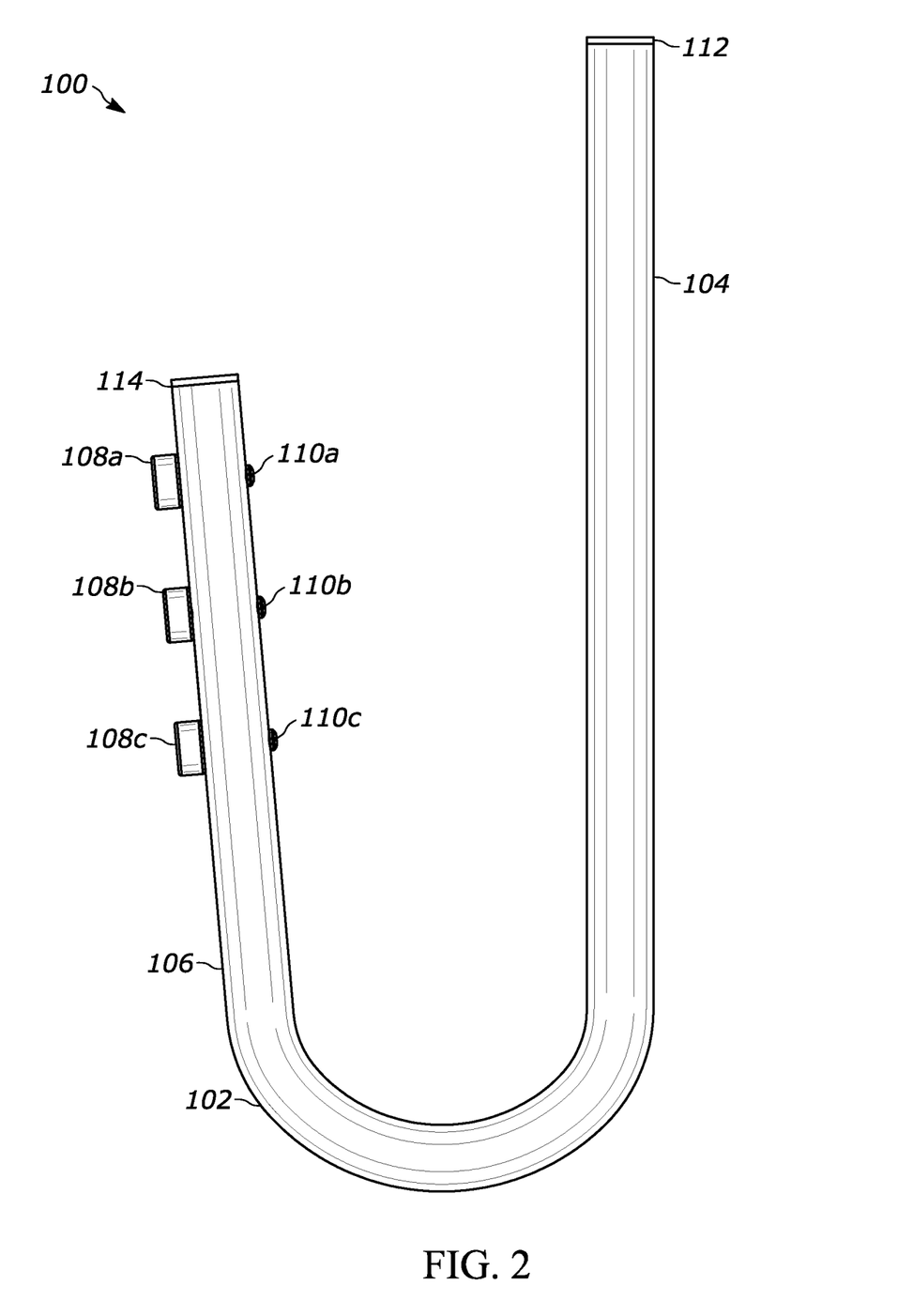
FIG. 2 is a side view of a packaging material holder in accordance with various embodiments.
Figure 3:
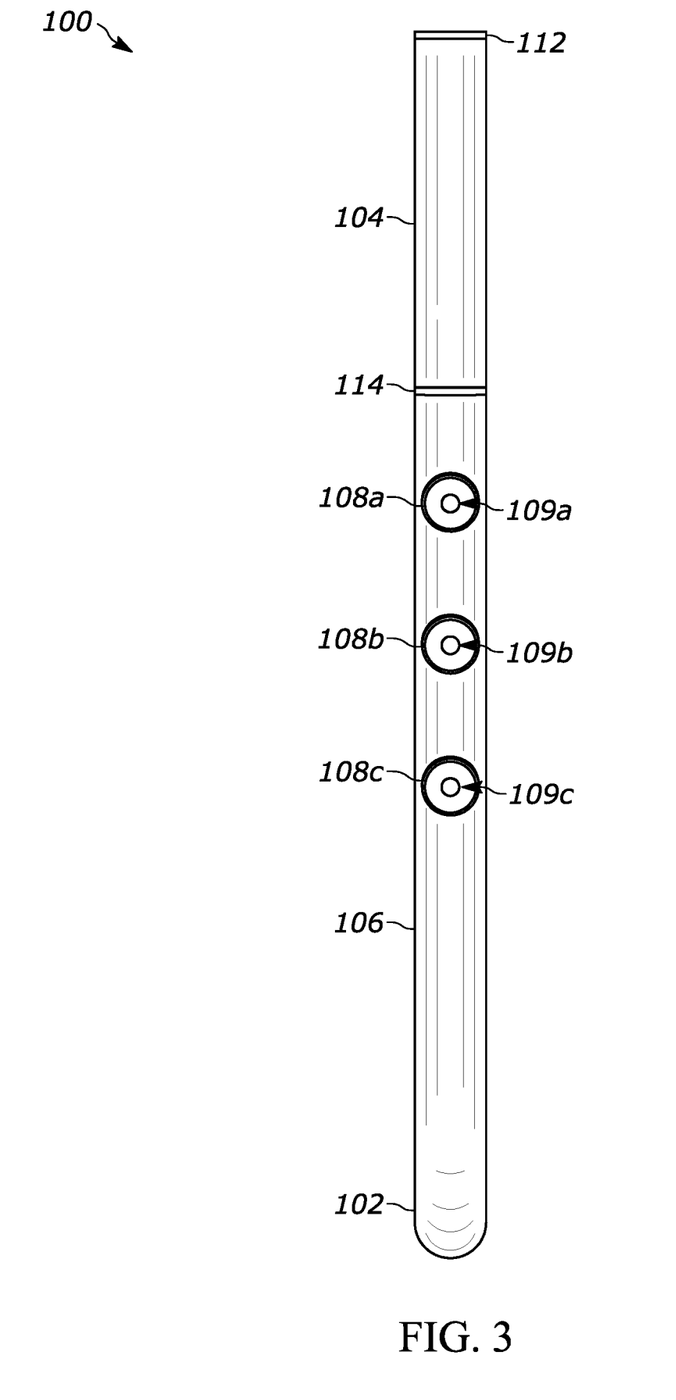
FIG. 3 is a rear view of a packaging material holder in accordance with various embodiments.

Referring now to the drawings, wherein identical numerals indicate the same elements throughout the figures, FIGS. 1 to 3 illustrate an example packaging material holder 100 in accord with some embodiments. The packaging material holder 100 includes a base portion 102, a first arm 104, and a second arm 106. The first arm 104 and the second arm 106 extend from the base portion 102. The base portion 102 may include a bend. The packaging material holder 100 may additionally or alternatively be comprised of a single rod or shaft or a plurality of pieces securely connected together in a configuration in accord with this description. The single rod or shaft may include a bend such that the base portion 102 may be defined as the bent portion of the rod or shaft. The packaging material holder 100 may be metal, plastic, carbon fiber, or another material strong enough to support the weight of the packaging material holder 100 and a roll of packaging material.

The base portion 102 may be bent, or defined, in such a way that the first arm 104 and the second arm 106 extend substantially parallel with respect to one another from the base portion 102. In some embodiments, the base portion 102 may include a bend of approximately 175 degrees such that the first arm 104 and the second arm 106 extend about 5 degrees from parallel with respect to one another. In another embodiment, the base portion 102 may include a bend of approximately 170 degrees such that the first arm 104 in the second arm 106 extend about 10 degrees from parallel with respect to one another.

The packaging material holder 100 may be substantially U-shaped or be substantially J-shaped where the base portion 102 is, or is defined by, the bent portion of the packaging material holder 100. In some embodiments, the first arm 104 and the second arm 106 are approximately the same length. In these embodiments, the packaging material holder 100 may be substantially U-shaped. In some embodiments, the first arm 104 and the second arm 106 may have different lengths. In these embodiments, the packaging material holder 100 may be substantially J-shaped. The first arm 104 and the second arm 106 may include a corresponding end cap, such as a first end cap 112 in a second end cap 114.

The packaging material holder 100 includes a plurality of magnets, for example, magnets 108a, 108b, and 108c, attached, coupled, and/or magnetically coupled to and along a length of the second arm 106. The plurality of magnets 108a, 108b, and 108c may be, for example, circular in shape, cylindrical in shape, square in shape, and/or ovular in shape. The magnets 108a, 108b, and 108c may be rare earth magnets, such as for example, neodymium or samarium cobalt magnets. The plurality of magnets 108a, 108b, and 108c may be attached to the second arm 106 using mechanical fasteners, such as screws, bolts, pins, and the like, which correspond to each magnet, for example screws 110a, 110b, and 110c. The screws 110a, 110b, and 110c may be on one side, such as the front, of the second arm 106 securing the magnets 108a, 108b, and 108c to the other side, such as the back, of the second arm 106.

The magnets 108a, 108b, and 108c may be substantially aligned with one another along the length of the second arm 106, as illustrated in FIG. 3. The magnets 108a, 108b, and 108c may be interspersed along the second arm 106. This may include, for example, the magnets 108a, 108b, and 108c disposed on the second arm 106 including even spacing from one another, meaning, for example, the distance between the magnet 108a and the magnet 108b is approximately the same distance between the magnet 108b and the magnet 108c. Additionally or alternatively, the magnets 108a, 108b, and 108c disposed on the second arm 106 including uneven spacing from one another, meaning for example, the distance between the magnet 108a and the magnet 108b is different as compared to the distance between the magnet 108b and the magnet 108c The packaging material holder 100 may be a circular rod or shaft, such as a cylinder or a cylindrical cross-section. In some embodiments, the packaging material holder 100 may have a square shape and/or cross-section. In the embodiments where the packaging material holder 100 is cylindrical, the packaging material holder 100 will have a diameter, and in turn the base portion 102, the first arm 104, and the second arm 106 may have the corresponding diameter. The packaging material holder 100 may have a consistent diameter or a varying diameter.

Figure 4:
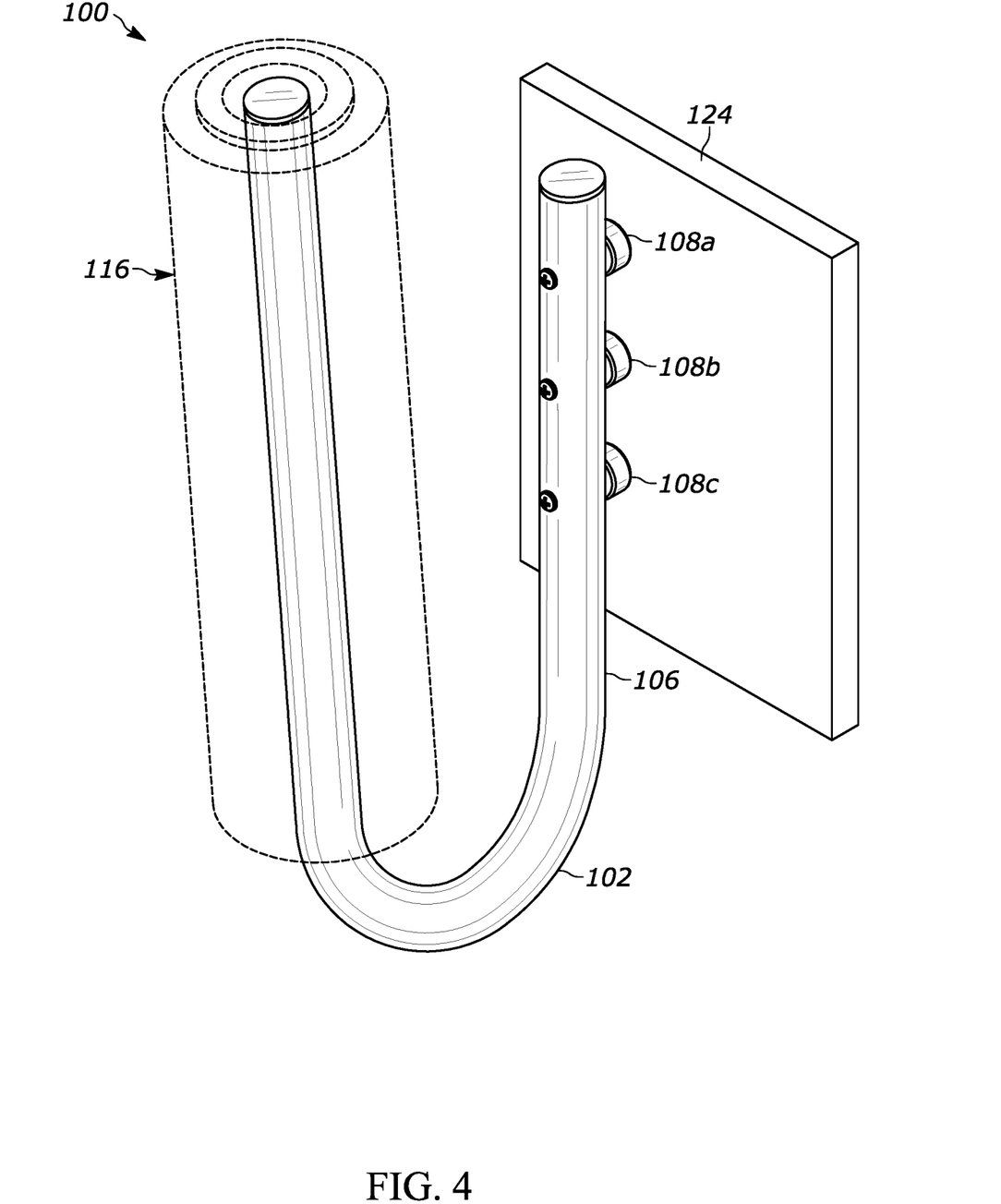
FIG. 4 is a perspective view of a packaging material holder including a roll of packaging material mounted to a mounting surface in accordance with various embodiments.

The size, such as the length of the first arm 104, the second arm 106, and the diameter of the packaging material holder 100 may be selected to permit certain sizes of rolls of packaging material to fit over the first end cap 112 of the first arm 104, such as the roll of packaging material 116 in FIG. 4. The roll of packaging material 116 may include an inner opening, having a diameter, to be placed on the first arm 104. The diameter of the inner opening will have a diameter larger than the diameter of the first arm 104 to be placed onto the packaging material holder 100.

In use, the packaging material holder 100 may magnetically couple, couple, and/or attach to a magnetic surface 124 via the magnets 108a, 108b, and 108c to store and/or to hold the roll of packaging material 116 on the packaging material holder 100. A roll of packaging material 116 may be placed over the end cap 112 and onto the first arm 104, assuming the diameter of the inner opening of the roll of packaging material 116 is larger than the diameter of at least the first arm 104. The roll of the packaging material 116 may contact and/or rest on a portion of the base portion 102. The size of the packaging material holder 100 may be selected to correspond to different inner opening diameters of the roll of packaging materials 116. This can allow the packaging material holder 100 to have an associated type of roll of packaging material 116 to hold and/or store. For example, if a roll of stretch film to be placed onto the packaging material holder 100 includes an inner opening having a diameter of about one inch, the packaging material holder 100 and/or the first arm 104 may be comprised of a rod and/or shaft having a diameter just smaller than one inch to permit a snug and/or secure fit of the stretch film on the first arm 104, or smaller than one inch to allow the roll to rotate during removal of the packaging material 116. Similarly, a length of the first arm 104 may be selectively chosen to fit a length of the roll of packaging material 116.

The magnets 108a, 108b, and 108c magnetically couple, couple, and/or attach the packaging material holder 100 to the surface 124 to support the mass and/or the weight of the packaging material holder 100 and, when holding a roll of packaging material 116, the mass and/or the weight of the roll of packaging material 116. This may be achieved through the use of magnets 108a, 108b, and 108c having various associated magnetic forces and strengths. This may additionally or alternatively include the magnets 108a, 108b, and 108c being spaced and/or placed at various distinct and/or different locations or in different configurations on and along the length of the second arm 106. Placing the magnets 108a, 108b, and 108c closer to the base portion 102, i.e., further down the second arm 106 away from the end cap 114 and towards the base portion 102, may place the magnets 108a, 108b, and 108c closer to the center of gravity, and in turn, provide stronger magnetic forces to support the associated mass and/or weight of the packaging material holder 100 and the roll of packaging material 116.

Figure 5:
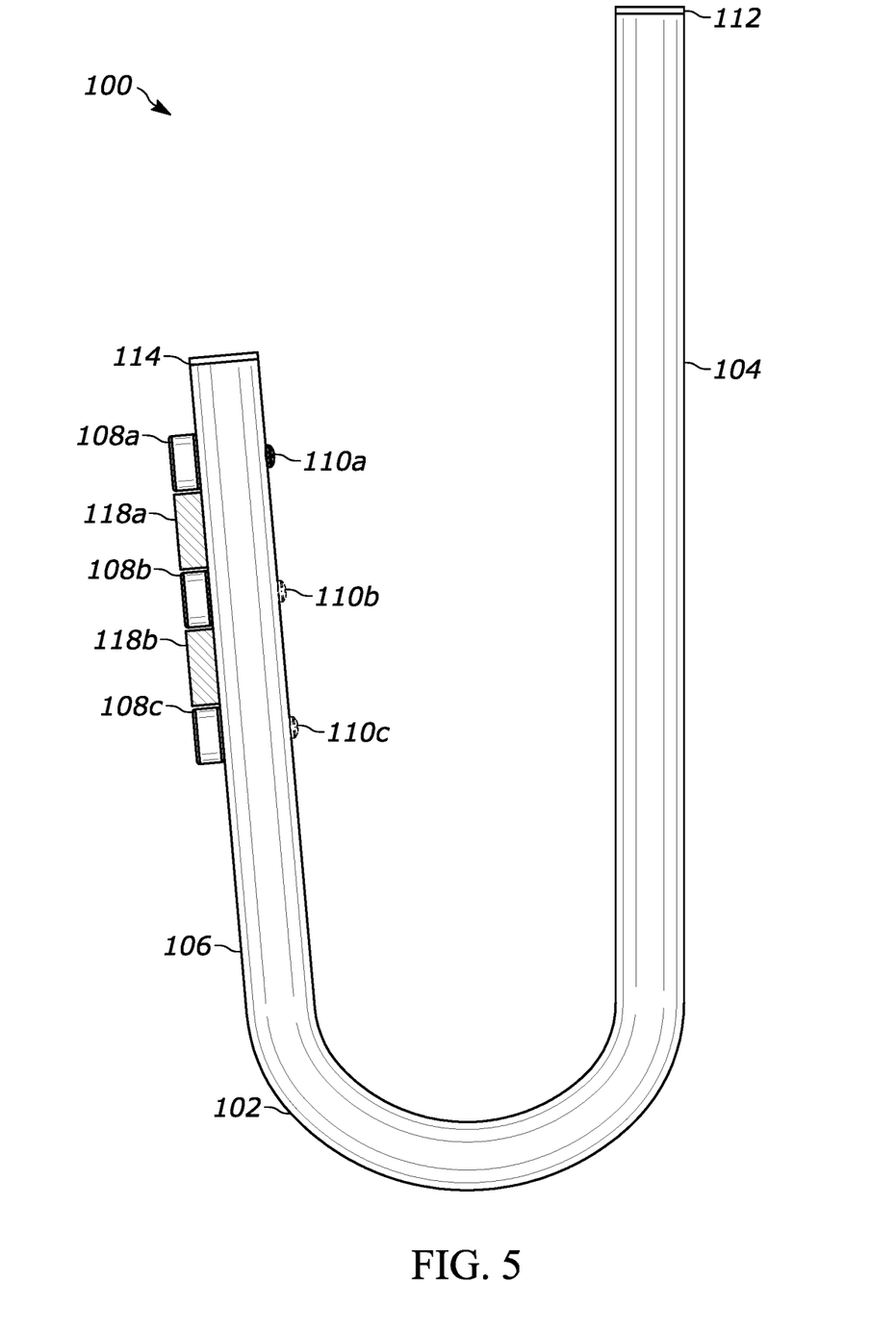
FIG. 5 is a side view of a packaging material holder including stoppers in accordance with various embodiments.
Figure 6:
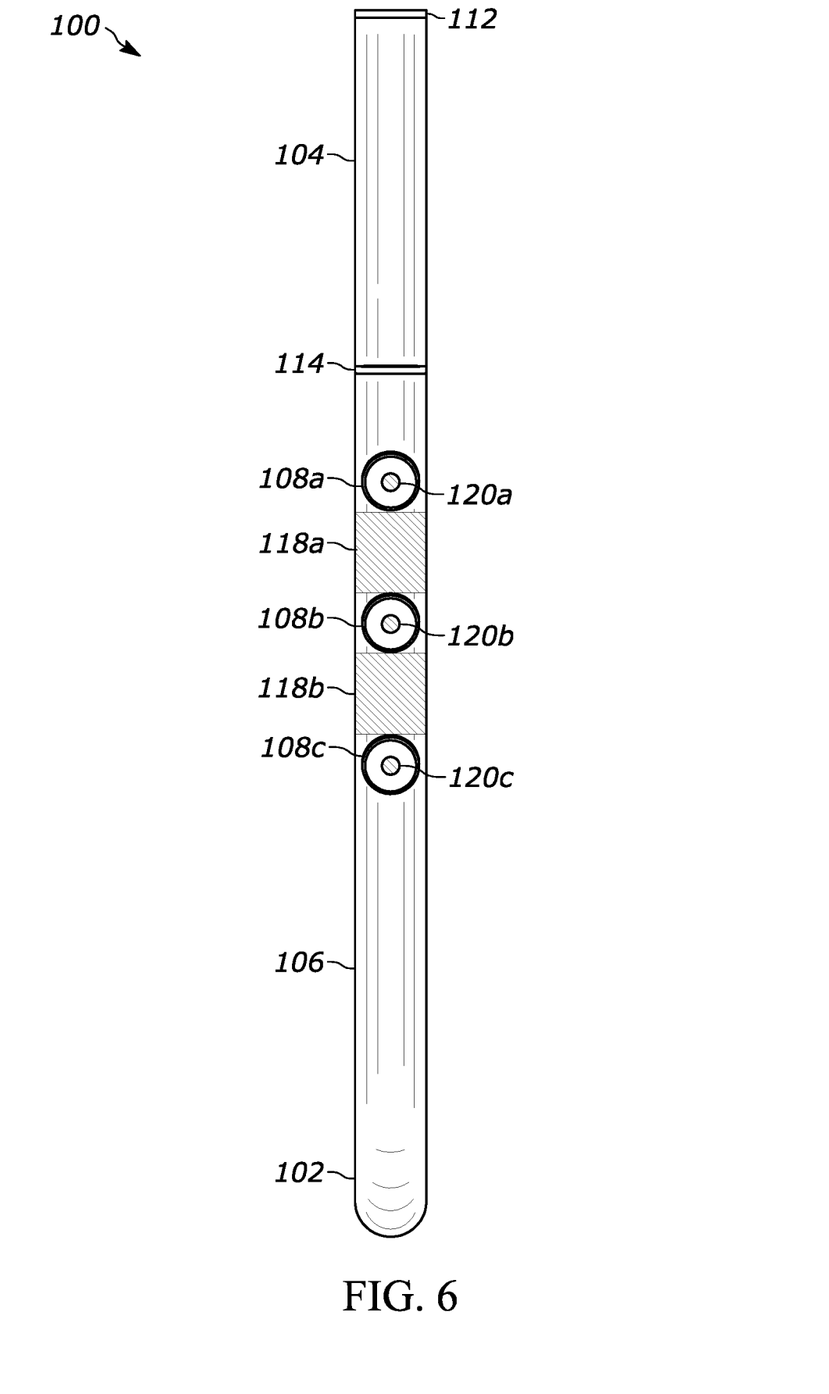
FIG. 6 is a rear view of a packaging material holder including stoppers in accordance with various embodiments.

In some embodiments, specifically referring to FIGS. 5 and 6, members made of a material such as plastic or rubber having a coefficient of friction higher than a surface of the magnets 108a, 108b, and 108c may be used in conjunction with the magnets 108a, 108b, and 108c. The members 118a and 118b may be disposed between the magnets 108a, 108b, and 108c. More specifically, a member 118a may be disposed between the magnet 108a and the magnet 108b. Similarly, the member 118b may be disposed between the magnet 108b and the magnet 108c. Additional elements, such as stoppers 120a, 120b, and 120c may be used to fill the openings 109a, 109b, and 109c of the corresponding magnets 108a, 108b, and 108c if magnets with openings, such as circular or cylindrical, are used.

Figure 7:
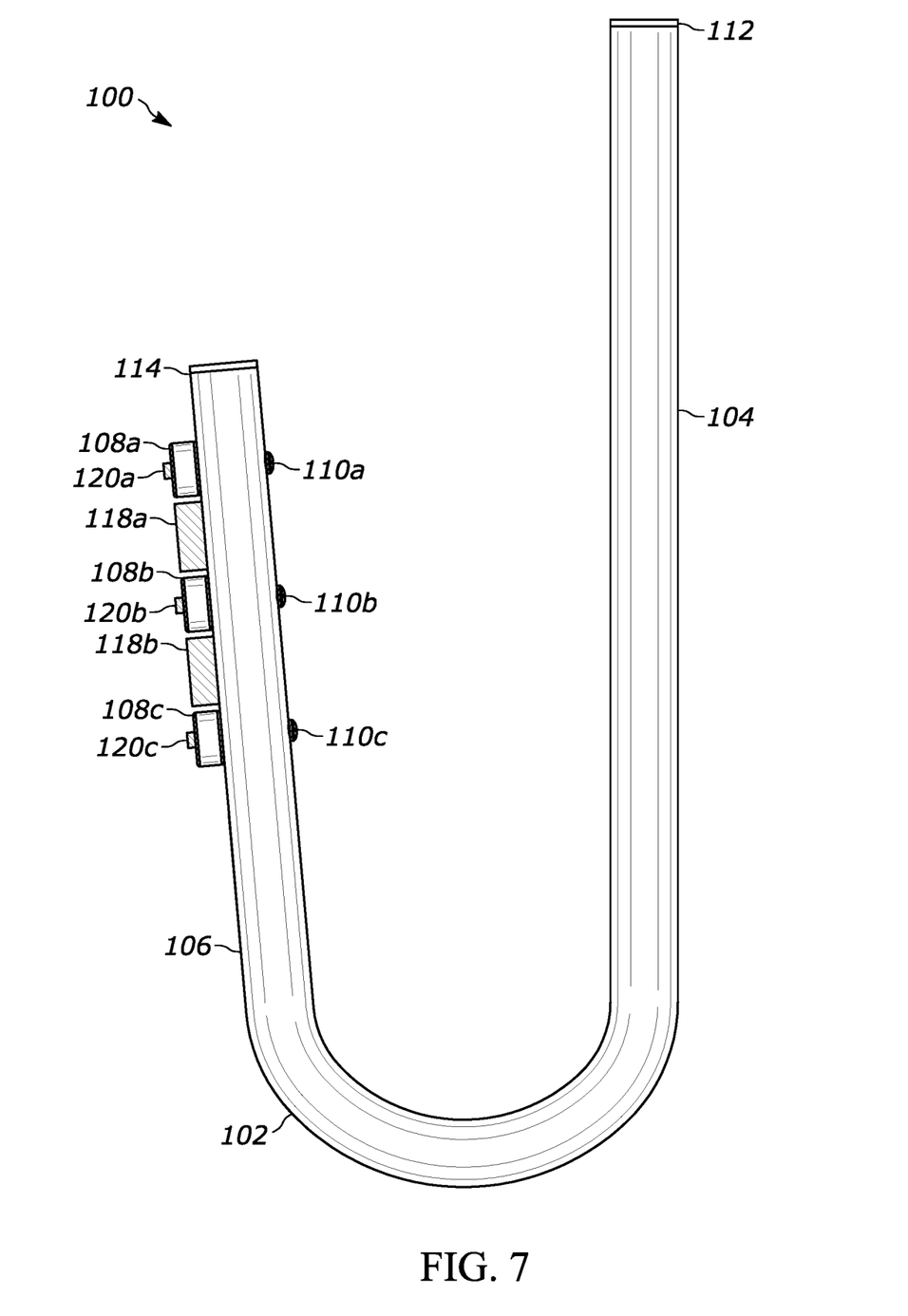
FIG. 7 is a side view of a packaging material holder including stoppers in accordance with various embodiments.

In some embodiments, specifically referring to FIG. 7, one or more of the stoppers 120a, 120b, and 120c are configured to extend beyond an outer surface of the opening of the one or more of the plurality of magnets 108a, 108b, and 108c to engage the magnetic surface 124 when the plurality of magnets 108a, 108b, and 108c magnetically couple to the magnetic surface 124.

Figure 8:
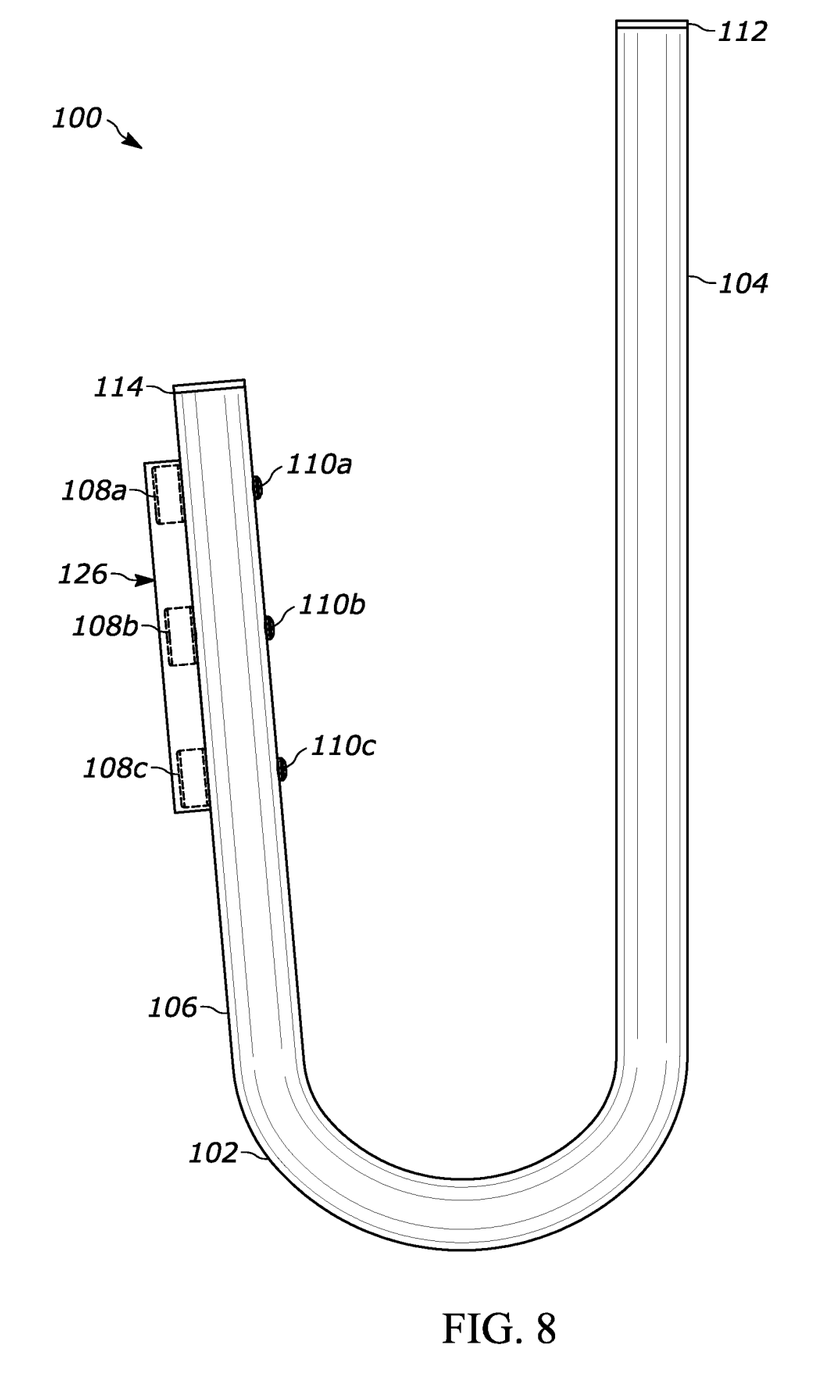
FIG. 8 is a side view of a packaging material holder including covers in accordance with various embodiments.
Figure 9:
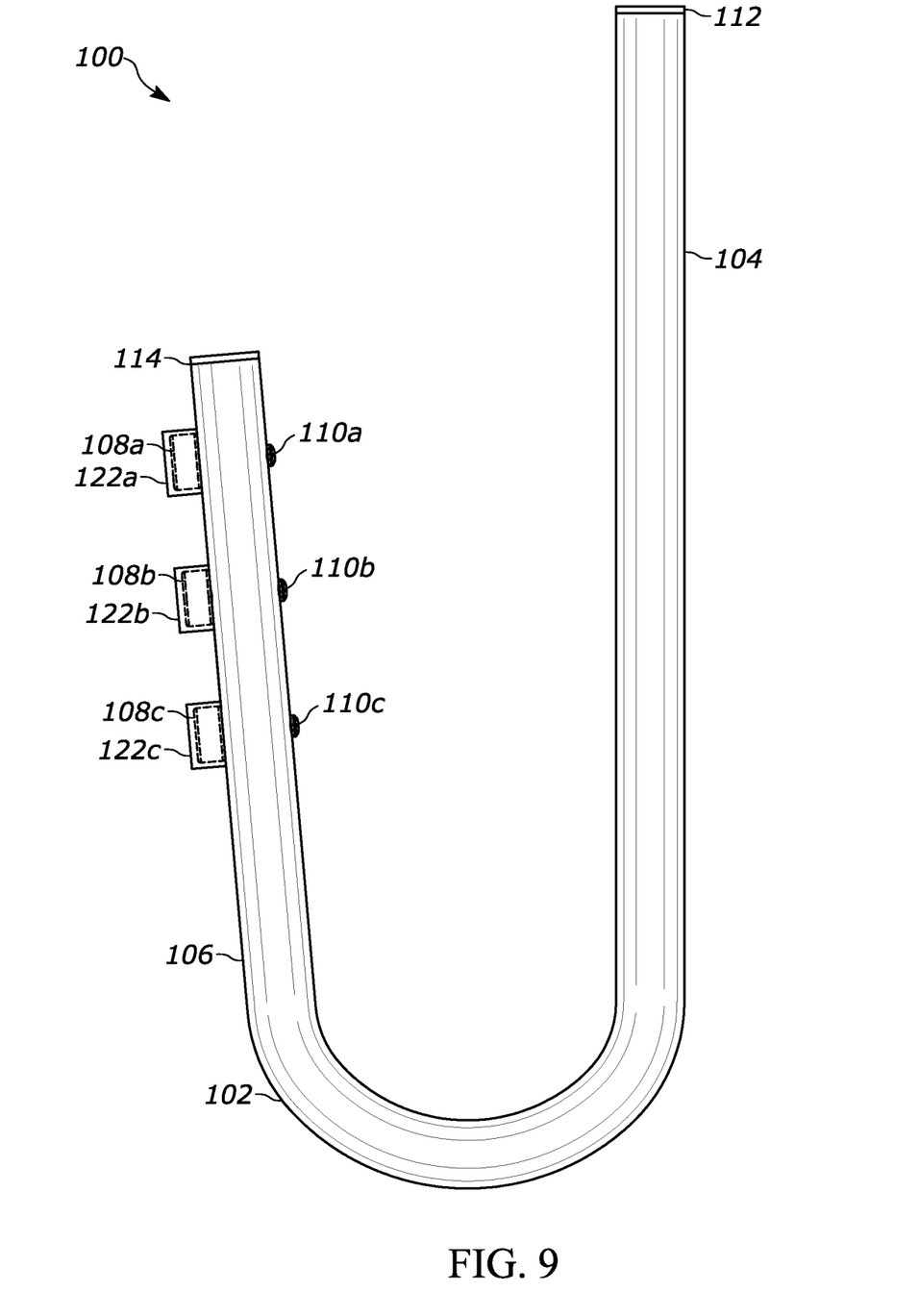
FIG. 9 is a side view of a packaging material holder including covers in accordance with various embodiments.

In some embodiments, referring to FIGS. 8 and 9, a further configuration including at least one cover is provided. Specifically referring to FIG. 8, a cover 126 may be disposed over at least one of the plurality of magnets, where the cover 126 has a coefficient of friction higher than a surface of the plurality of magnets that engages the mounting surface 124. In a further configuration, specifically referring to FIG. 9, covers 122a, 122b, and 122c may be disposed over at least one of the plurality of magnets, where the covers 122a, 122b, and 122c have a coefficient of friction higher than a surface of the plurality of magnets that engages the mounting surface 124.

The members 118a and 118b, stoppers 120a, 120b, and 120c, and covers 126, 122a, 122b, and 122c may be used in any combination to increase a friction force between the packaging material holder 100 and the surface the magnets 108a, 108b, and 108c are magnetically coupled and/or attached to. While the magnets 108a, 108b, and 108c may support the weight and/or the mass of the packaging material holder 100 and the roll of packaging material 116, the members 118a and 118b, stoppers 120a, 120b, and 120c, and covers 122a, 122b, and 122c may aid in preventing or reducing the chance of sliding or slipping of the packaging material holder 100 down the magnetic surface 124 due to the associated mass and/or weight of the packaging material holder 100 and the roll of packaging material 116.

In some embodiments, the strength, i.e., the associated magnetic force of the magnets 108a, 108b, and 108c, may have a similar force as compared to the weight and/or the mass of the packaging material holder 100 and the roll of packaging material 116. In these instances, members 118a and 118b, stoppers 120a, 120b, and 120c, and covers 122a, 122b, and 122c may provide sufficient friction forces to prevent the sliding or slipping of the packaging material holder 100 down the mounting surface 124.

Figure 10:
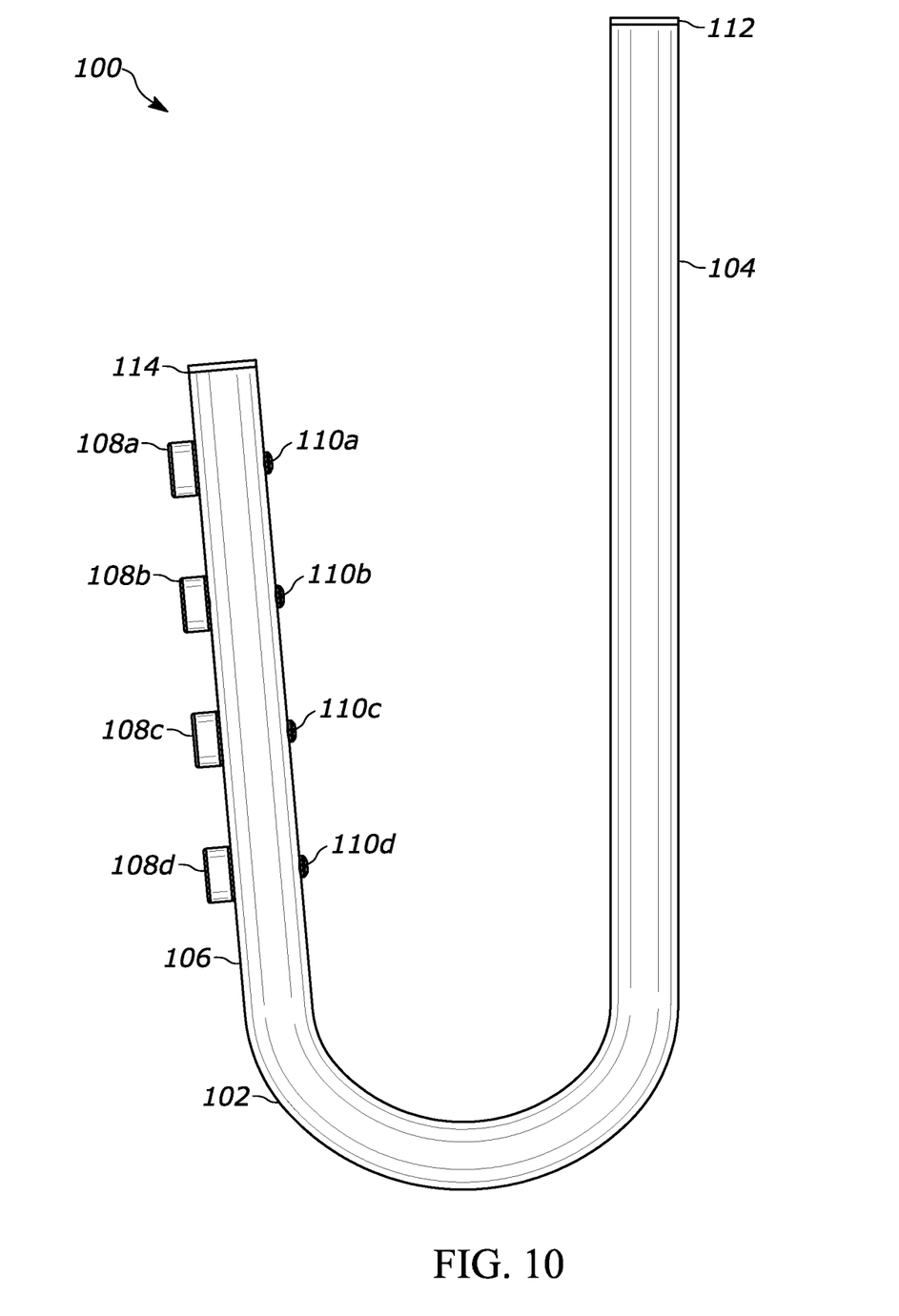
FIG. 10 is a side view of a packaging material holder in accordance with various embodiments.

In some embodiments, referring to FIG. 10, the packaging material holder 100 includes four or more magnets. The fourth magnet 108d may be similar to the magnets 108a, 108b, and 108c discussed above. The fourth magnet 108d may be placed along the length of the second arm 106 to provide additional magnetic force to support the mass and/or the weight of the packaging material holder 100 and, when holding a roll of packaging material 116, the mass and/or the weight of the roll of packaging material 116. The fourth magnet 108d may be evenly spaced from the magnets 108a, 108b, and 108c, or in some embodiments, have an uneven spacing as compared to the magnets 108a, 108b, and 108c.

In these four magnet embodiments, stoppers, members, and covers, such as those described above with reference to FIGS. 5 to 9 may be used as well. This may include having one or more stoppers disposed between the four magnets, as well as having one or more covers covering the openings of the four magnets. In some embodiments, a stopper may be disposed above the top magnet, for example magnet 108a, closest to the second end cap 114 of the second arm 106. In some embodiments a stopper may be disposed below the bottom magnet, for example magnet 108c, closest to the base portion 102.

Figure 11:
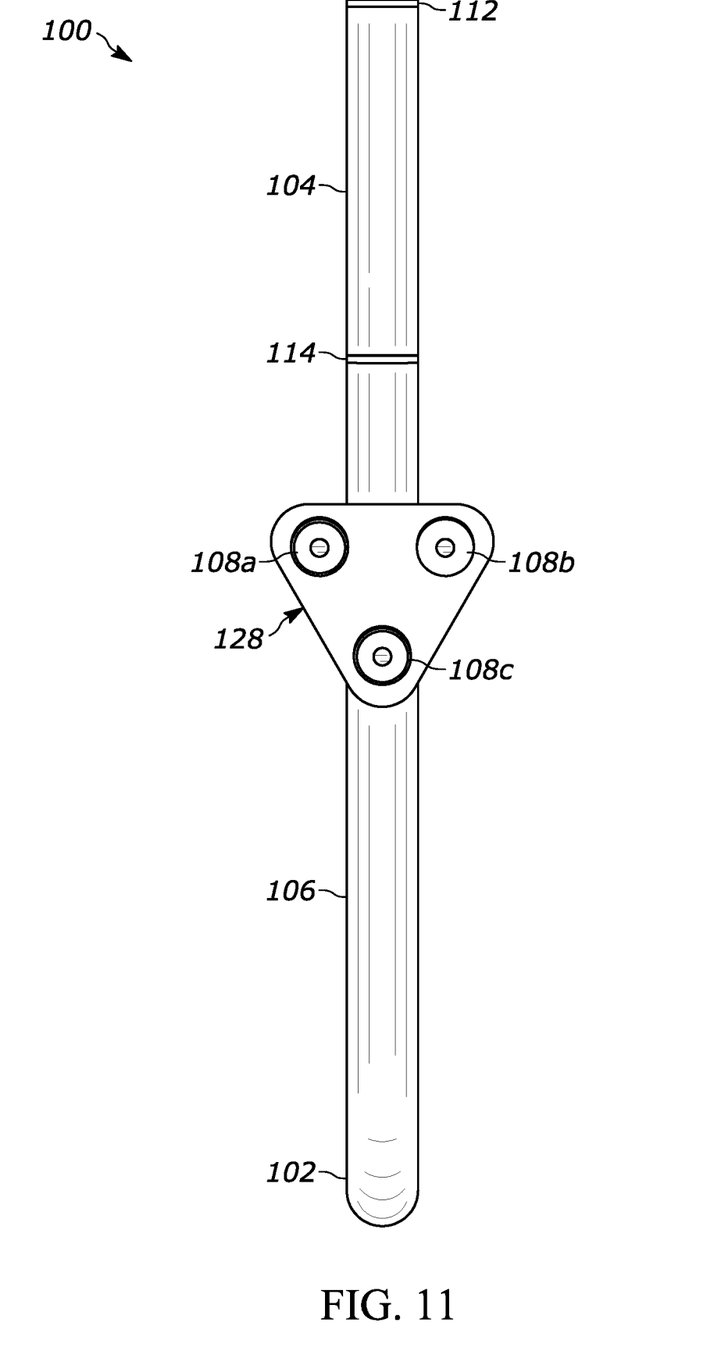
FIG. 11 is a rear view of a packaging material holder in accordance with various embodiments.

In some embodiments, specifically referring to FIG. 11, the magnets 108a, 108b, and 108c may be in a T-shape or an inverted T-shape, such as a wing-structure 128 or formation having two magnets on either side of, and substantially perpendicular to, the second arm 106 with an additional magnet above or below. This wing-structure 128, again similar to that described above, may be utilized to provide sufficient magnetic force to support the mass and/or the weight of the packaging material holder 100 and, when holding a roll of packaging material 116, the mass and/or the weight of the roll of packaging material 116. A plastic or rubber cover may be used to house the magnets in to provide a friction force between the packaging material holder 100 and the mounting surface 124 to help prevent the packaging material holder 100 from slipping and/or sliding down the mounting surface 124.

Those skilled in the art will recognize that a wide variety of other modifications, alterations, and combinations can also be made with respect to the above-described embodiments without departing from the scope of the disclosure, and that such modifications, alterations, and combinations are to be viewed as being within the ambit of the inventive concept.

What is claimed is:

1. A packaging material holder comprising:
a bent shaft including a first arm, a base portion, and a second arm; and
a plurality of magnets attached to the second arm;
wherein the first arm includes an end configured to permit a roll of packaging material having an opening larger than a diameter of the end of the first arm to be placed over the end of the first arm and contact the base portion, and
wherein the plurality of magnets are configured to magnetically couple to a magnetic surface and support a mass of the packaging material holder and a mass of the roll of packaging material,
wherein the base portion includes a bend of approximately 175 degrees such that the first arm extends from the base portion about 5 degrees from parallel and the second arm extends substantially parallel from the base portion, wherein the plurality of magnets are disposed along the second arm such that the plurality of magnets are substantially aligned along a side of the second arm facing away from the first arm.

2. The packaging material holder of claim 1 wherein the bent shaft is comprised of metal.

3. The packaging material holder of claim 1 wherein individual ones of the plurality of magnets are cylindrical and define an opening to permit a fastener to secure the individual ones of the plurality of magnets to the second arm.

4. The packaging material holder of claim 3 further comprising a stopper disposed within the opening of one or more of the plurality of magnets, the stopper having a coefficient of friction higher than a surface of the plurality of magnets.

5. The packaging material holder of claim 4 wherein the stopper extends beyond an outer surface of the opening of the one or more of the plurality of magnets to engage the magnetic surface when the plurality of magnets magnetically couple to the magnetic surface.

6. The packaging material holder of claim 1 further comprising a frictional member disposed between at least two of the plurality of magnets, the frictional member having a coefficient of friction higher than a surface of the plurality of magnets and configured to extend beyond an outer surface the at least two of the plurality of magnets to engage the magnetic surface when the plurality of magnets magnetically couple to the magnetic surface.

7. The packaging material holder of claim 1 further comprising a cover disposed over at least one of the plurality of magnets, the cover having a coefficient of friction higher than a surface of the plurality of magnets.

8. The packaging material holder of claim 1 where the plurality of magnets comprises at least four magnets attached to the second arm.

9. The packaging material holder of claim 1 wherein the plurality of magnets are evenly spaced from one another along the second arm.

10. The packaging material holder of claim 1 wherein the second arm includes a first side and a second side and the plurality of magnets includes a first magnet attached to the first side and a second magnet attached to the second side of the second arm such that the first magnet and second magnet are aligned on an axis perpendicular to the second arm.

11. The packaging material holder of claim 10 further comprising a cover disposed over the first magnet and the second magnet and extending across a side of the second arm facing away from the first arm, the cover having a coefficient of friction higher than a surface of the plurality of magnets.

12. The packaging material holder of claim 11, wherein the cover is comprised of rubber or plastic.

13. A packaging material holder comprising:
a bent shaft including a first arm, a base portion, and a second arm, wherein the base portion includes a bend of approximately 175 degrees such that the first arm extends from the base portion about 5 degrees from parallel and the second arm extend substantially parallel from the base portion, and wherein the first arm includes an end which permits a roll of packaging material having an opening larger than a diameter of the end of the first arm to be placed over the end of the first arm and contact the base portion;
a plurality of magnets attached to the second arm and magnetically couple to a magnetic surface, wherein the plurality of magnets are substantially aligned with one another, and the plurality of magnets are substantially evenly spaced from one another; and
at least two frictional members disposed between the plurality of magnets to increase a friction force between the packaging material holder and the magnetic surface, and provide support for a mass of the packaging material holder and a mass of the roll of packaging material.

* * * * *